United States Patent
Elkayam et al.

(10) Patent No.: US 7,046,983 B2
(45) Date of Patent: May 16, 2006

(54) INTEGRAL BOARD AND MODULE FOR POWER OVER LAN

(75) Inventors: Shimon Elkayam, Kfar Saba (IL); Ilan Atias, Haifa (IL); Dror Korcharz, Bat Yam (IL); David Pincu, Holon (IL); Alon Ferentz, Bat Yam (IL); Amir Lehr, Hertzeliya (IL); Yair Darshan, Petach Tikva (IL); Nadav Barnea, Or Yehuda (IL); Yuval Berson, Benyamina (IL)

(73) Assignee: PowerDsine, Ltd., Hod Hasharon (IL)

( * ) Notice: Subject to any disclaimer, the term of this patent is extended or adjusted under 35 U.S.C. 154(b) by 367 days.

(21) Appl. No.: 10/334,386

(22) Filed: Dec. 31, 2002

(65) Prior Publication Data

US 2003/0099076 A1 May 29, 2003

Related U.S. Application Data

(63) Continuation-in-part of application No. 10/218,739, filed on Aug. 13, 2002, which is a continuation of application No. 09/365,584, filed on Aug. 2, 1999, now Pat. No. 6,473,608.

(51) Int. Cl.
*H04M 9/00* (2006.01)

(52) U.S. Cl. ............... 455/402; 455/67.14; 713/402; 713/310; 379/402

(58) Field of Classification Search ............ 455/402, 455/572, 67.14, 343.6, 400; 713/300, 310, 713/323, 340; 379/402, 390.04, 413; 370/402, 370/274, 353, 908, 338
See application file for complete search history.

(56) References Cited

U.S. PATENT DOCUMENTS

| | | | |
|---|---|---|---|
| 4,467,314 A | 8/1984 | Weikel et al. | |
| 4,528,667 A | 7/1985 | Fruhauf | |
| 4,692,761 A | 9/1987 | Robinton | |
| 4,733,389 A | 3/1988 | Puvogel | |
| 4,799,211 A | 1/1989 | Felker et al. | |
| 4,815,106 A | 3/1989 | Propp et al. | |
| 4,885,563 A | 12/1989 | Johnson et al. | |
| 4,903,006 A | 2/1990 | Boomgaard | |
| 4,992,774 A | 2/1991 | McCullough | |
| 5,032,833 A | 7/1991 | Laporte | |
| 5,066,939 A | 11/1991 | Mansfield, Jr. | |

(Continued)

FOREIGN PATENT DOCUMENTS

WO    WO 92/17968    10/1992

(Continued)

OTHER PUBLICATIONS

PowerDsine Product Catalogue 1999, pp. 56-79 and 95-105, Israel.

(Continued)

*Primary Examiner*—Edan Orgad
(74) *Attorney, Agent, or Firm*—Simon Kahn

(57) ABSTRACT

Apparatus for supplying power to communication devices operating within a Local Area Network (LAN) over LAN cabling, the communication devices including one or more powered devices adapted to receive power over the LAN cabling, the apparatus including a power supply which is adapted to receive power from an unregulated source and to provide therefrom regulated power. The apparatus further includes power distribution and control circuitry, which is adapted to identify the powered devices on the LAN, to receive the regulated power and to generate therefrom respective output voltages for supply to the powered devices. The apparatus is housed in a chassis which retains the power supply and the power distribution and control circuitry as a single module.

40 Claims, 4 Drawing Sheets

U.S. PATENT DOCUMENTS

| | | | |
|---|---|---|---|
| 5,093,828 A | 3/1992 | Braun et al. | |
| 5,192,231 A | 3/1993 | Dolin, Jr. | |
| 5,351,272 A | 9/1994 | Abraham | |
| 5,452,344 A | 9/1995 | Larson | |
| 5,491,463 A | 2/1996 | Sargeant et al. | |
| 5,652,893 A | 7/1997 | Ben Meir et al. | |
| 5,682,301 A * | 10/1997 | Kraft | 361/826 |
| 5,684,826 A | 11/1997 | Ratner | |
| 5,689,230 A | 11/1997 | Merwin et al. | |
| 5,742,833 A * | 4/1998 | Dea et al. | 713/323 |
| 5,799,196 A | 8/1998 | Flannery | |
| 5,828,293 A | 10/1998 | Rickard | |
| 5,835,005 A | 11/1998 | Furukawa et al. | |
| 5,859,596 A | 1/1999 | McRae | |
| 5,884,086 A * | 3/1999 | Amoni et al. | 700/282 |
| 5,939,801 A * | 8/1999 | Bouffard et al. | 307/65 |
| 5,991,885 A * | 11/1999 | Chang et al. | 713/300 |
| 5,994,998 A | 11/1999 | Fisher et al. | |
| 6,033,101 A | 3/2000 | Reddick et al. | |
| 6,115,468 A * | 9/2000 | De Nicolo | 375/257 |
| 6,125,448 A | 9/2000 | Schwan et al. | |
| 6,140,911 A | 10/2000 | Fisher et al. | |
| 6,218,930 B1 | 4/2001 | Katzenberg et al. | |
| 6,243,818 B1 | 6/2001 | Schwan et al. | |
| 6,301,527 B1 | 10/2001 | Butland | |
| 6,329,906 B1 | 12/2001 | Fisher et al. | |
| 6,348,874 B1 | 2/2002 | Cole et al. | |
| 6,377,874 B1 | 4/2002 | Ykema | |
| 6,393,607 B1 | 5/2002 | Hughes et al. | |
| 6,480,510 B1 | 11/2002 | Binder | |
| 6,496,105 B1 | 12/2002 | Fisher et al. | |
| 6,753,761 B1 | 6/2004 | Fisher et al. | |
| 2003/0058085 A1 | 3/2003 | Fisher et al. | |

FOREIGN PATENT DOCUMENTS

| | | |
|---|---|---|
| WO | WO 96/23377 | 8/1996 |
| WO | WO 9623377 A1 * | 8/1996 |

OTHER PUBLICATIONS

Bearfield, J.M., "Control the Power Interface of USB's Voltage Bus", Electronic Design, U.S., Penton Publishing, Cleveland, Ohio, vol. 45, No. 15, Jul. 1997, p. 80, 82, 84, 85.

* cited by examiner

INTEGRAL BOARD AND MODULE FOR POWER OVER LAN

RELATED APPLICATION

This application is a continuation-in-part of a U.S. patent application Ser. No. 10/218,739 entitled "Improved Structure Cabling System," filed Aug. 13, 2002, which is a CON of Ser. No. 09/365,584 Aug. 2, 1999 Pat. No. 6,473,608 which is incorporated herein by reference.

FIELD OF THE INVENTION

The present invention relates generally to power supplies, and specifically to power supplies which provide power over network communication links.

BACKGROUND OF THE INVENTION

Power over LAN™, or Power over Ethernet, is a new technology that enables DC power to be supplied to Ethernet data terminals over ordinary local area network (LAN) cabling such as Category 5 cabling. This technology enables the terminals, termed powered devices (PDs), to receive their operating power over the same Ethernet LAN connection that they use for data communication. It thus eliminates the need to connect each terminal to an AC power socket, and to provide each terminal with its own AC/DC power converter. The technology also enables PDs to be recognized as such by a "signature" generated by the terminal. Further aspects of this technology, including a capacitor signature detection method, are described in PowerDsine Application Notes 115 and 111, entitled "Power over LAN™: Building Power Ready Devices" and "Analysis of the PD/Power over LAN™ Hub requirements" published by PowerDsine Ltd., Hod Hasharon, Israel, which are incorporated herein by reference. The LAN MAN Standards Committee of the IEEE Computer Society is developing specifications for Power over LAN systems, as described in IEEE Drafts P802.3af/D3.0 or later, entitled "Data Terminal Equipment (DTE) Power via Media Dependent Interface (MDI)" (IEEE Standards Department, Piscataway, N.J., 2001), which is also incorporated herein by reference. The specifications are referred to herein as standard 802.3af.

A Power over LAN system comprises an Ethernet switch and a power hub, which serves as the DC power source, along with a number of PD terminals, which communicate via the switch and draw power from the hub. The system is typically connected in a star topology, with each terminal linked by a cable to the switch and hub. The power hub in one chassis may be integrated with the switch in a second chassis, in a console containing both chassis, in what is known as an "end-span" configuration. Alternatively, the power hub chassis may be located between the switch chassis and the terminals, in a "mid-span" configuration. DC power is carried to the loads (i.e., the terminals) over twisted pairs provided by Category 5 cabling. The end-span configuration uses twisted-data-pairs that are also used for Ethernet communication; the mid-span configuration uses spare twisted-spare-pairs that are not used for Ethernet communication.

SUMMARY OF THE INVENTION

Preferred embodiments of the present invention seek to provide a single Power over LAN module which houses a power supply and power distribution and control circuitry. Powered devices in the local area network (LAN) are coupled to the module by data communication cabling. The circuitry receives power from the power supply and generates output voltages for supply to the powered devices via the cabling. The single module is dimensioned so that it fits a pre-defined existing space. By so dimensioning the single module, it is able to fit and/or be retrofitted, into a standard switching hub chassis.

In some preferred embodiments of the present invention, the Power over LAN module is implemented as a power supply for Ethernet switches. The module is preferably mounted in an Ethernet switch chassis having a collocated Ethernet switch board, in an end-span configuration. The module provides power to the collocated Ethernet switch board within the chassis, as well as to Ethernet switches remote from the collocated board, or any other network element coupled to the collocated board, via twisted-data-pair communication lines connecting the remote switches and/or elements to the collocated board. The switch chassis is implemented according to industry-standard dimensions, and thus the combined module and switch are mountable in a standard enclosure for "stackable" switches.

Alternatively, the module is configured in a mid-span arrangement, by being housed within a power hub intermediate between the Ethernet switch and powered devices. In this configuration, the power is conveyed to the powered devices via twisted-spare-pairs of communication lines.

There is therefore provided, according to a preferred embodiment of the present invention, apparatus for supplying power to communication devices operating within a Local Area Network (LAN) over LAN cabling, the communication devices including one or more powered devices adapted to receive power over the LAN cabling, the apparatus including:

a power supply which is adapted to receive power from an unregulated source and to provide therefrom regulated power;

power distribution and control circuitry, which is adapted to identify the powered devices on the LAN, to receive the regulated power and to generate therefrom respective output voltages for supply to the powered devices; and a chassis which retains the power supply and the power distribution and control circuitry as a single module.

Preferably, the apparatus includes a switching hub within which the single module is disposed, and wherein the power supply provides further regulated power to power the switching hub, and one or more further single modules each of which is disposed within the switching hub and is substantially similar to the single module.

Preferably, the switching hub includes dimensions enabling the switching hub to be disposed within an industry-standard rack.

Further preferably, the dimensions consist of a height no greater than 45 mm and a width no greater than 430 mm.

Preferably, the module has dimensions enabling the module to replace a switching hub power supply disposed in the hub and adapted to only power the hub, and the LAN cabling includes at least one cable which is coupled to a respective powered device included in the powered devices, and the at least one cable includes a twisted-data-pair of conductors which provide data communication to the respective powered device, and the power distribution and control circuitry is adapted to provide powered-device regulated power over the twisted-data-pair to the respective powered device.

Further preferably, the LAN cabling includes at least one cable which is coupled to a respective powered device included in the powered devices, and the at least one cable includes a twisted-spare-pair of conductors which are adapted to provide data communication to the respective powered device, and the power distribution and control circuitry is adapted to provide powered-device regulated power over the twisted-spare-pair to the respective powered device.

Preferably, the power distribution and control circuitry is adapted to provide powered-device regulated power, derived from the respective output voltages, to at least one powered device included in the powered devices, and to adjust a level of the powered-device regulated power allocated to the at least one powered device responsive to an overall level of total powered-device regulated power provided by the power distribution and control circuitry to the powered devices.

Preferably, the power supply is adapted to receive the power as alternating current (AC) power or as direct current (DC) power.

Preferably, the apparatus includes a redundant power supply (RPS) which is adapted to supply redundant regulated power, and the power distribution and control circuitry is adapted to receive at least one of the regulated power and the redundant regulated power.

The apparatus preferably further includes a controller having a memory wherein is stored at least one parameter of the RPS, and the controller is adapted to measure a parameter of the regulated power and to operate the apparatus in an RPS mode, wherein at least one of the power supply and the power distribution and control circuitry receive power from the RPS, and to control at least one of the respective output voltages responsive to the at least one RPS parameter and the measured parameter.

Further preferably, the apparatus includes a switching hub external to the module, and a first cable included in the LAN cabling, the first cable being adapted to convey data between the switching hub and the module, wherein the power and control circuitry is adapted to convey the respective output voltages and the data to at least one of the powered devices via a second cable comprised in the LAN cabling, so that the module acts as a mid-span device.

Preferably, the communication devices communicate over the LAN according to an IEEE standard 802.3af.

There is further provided, according to a preferred embodiment of the present invention, apparatus for supplying power to communication devices operating within a Local Area Network (LAN) over LAN cabling, the communication devices including one or more powered devices adapted to receive power over the LAN cabling, the apparatus including:

circuitry, which is adapted to identify the powered devices on the LAN and to generate respective output voltages for supplying power to the powered devices over the LAN cabling, wherein the circuitry comprises a first application specific integrated circuit (ASIC); and a controller which monitors and controls the circuitry and which together with the circuitry monitors and controls the output voltages and the power supplied to the powered devices, and which is implemented as a second ASIC.

Preferably, the first ASIC is mounted on a first single in-line package (SIP) and the second ASIC is mounted on a second SIP.

The apparatus preferably also includes:

a board to which the first SIP and the second SIP are mounted so as to form a single module; and a switching hub which is adapted to receive the single module.

Preferably, the board functions as a daughter board which is adapted to be mounted on a mother board comprised in the switching hub.

Further preferably, the switching hub includes dimensions enabling the switching hub to be disposed within an industry-standard rack, and the dimensions consist of a height no greater than 45 mm and a width no greater than 430 mm.

Preferably, the switching hub includes a chassis having a back plane with connectors which are adapted to receive respective individual cards, and the board is adapted to mount on at least one of the individual cards.

There is further provided, according to a preferred embodiment of the present invention, a method for supplying power to communication devices operating within a Local Area Network (LAN) over LAN cabling, the communication devices including one or more powered devices adapted to receive power over the LAN cabling, the method including:

receiving power from an unregulated source in a power supply;

generating in the power supply regulated power from the unregulated source;

identifying the powered devices on the LAN in power distribution and control circuitry;

receiving the regulated power in the power distribution and control circuitry;

generating in the power distribution and control circuitry, responsive to the regulated power, respective output voltages for supply to the powered devices; and housing the power supply and the power distribution and control circuitry as a single module.

Preferably, the method further includes providing a switching hub within which the single module is disposed, and the power supply provides a further regulated power level to power the switching hub.

Preferably, the method includes providing one or more further single modules each of which is substantially similar to the single module, and disposing each further single module within the switching hub.

Further preferably, the switching hub includes dimensions enabling the switching hub to be disposed within an industry-standard rack, and the dimensions consist of a height no greater than 45 mm and a width no greater than 430 mm.

Preferably, the module has dimensions enabling the module to replace a switching hub power supply disposed in the hub and adapted to only power the hub.

Preferably, the LAN cabling includes at least one cable which is coupled to a respective powered device comprised in the powered devices, and the at least one cable includes a twisted-data-pair of conductors which provide data communication to the respective powered device, and the power distribution and control circuitry is adapted to provide powered-device regulated power over the twisted-data-pair to the respective powered device.

Further preferably, the LAN cabling includes at least one cable which is coupled to a respective powered device included in the powered devices, and the at least one cable includes a twisted-spare-pair of conductors which are adapted to provide data communication to the respective powered device, and the power distribution and control circuitry is adapted to provide powered-device regulated power over the twisted-spare-pair to the respective powered device.

Preferably, the power distribution and control circuitry is adapted to provide powered-device regulated power, derived from the respective output voltages, to at least one powered device included in the powered devices, and to adjust a level of the powered-device regulated power allocated to the at least one powered device responsive to an overall level of total powered-device regulated power provided by the power distribution and control circuitry to the powered devices.

Preferably, receiving the power in the power supply includes receiving alternating current (AC) power or direct current (DC) power.

The method preferably further includes providing a redundant power supply (RPS) which is adapted to supply redundant regulated power, wherein the power distribution and control circuitry is adapted to receive at least one of the regulated power and the redundant regulated power.

Further preferably, the method includes providing a controller having a memory wherein is stored at least one parameter of the RPS, wherein the controller is adapted to measure a parameter of the regulated power and to operate the apparatus in an RPS mode wherein at least one of the power supply and the power distribution and control circuitry receive power from the RPS, and to control at least one of the respective output voltages responsive to the at least one RPS parameter and the measured parameter.

The method preferably further includes providing a switching hub external to the module, and a first cable included in the LAN cabling, the first cable being adapted to convey data between the switching hub and the module, and the power and control circuitry is adapted to convey the respective output voltages and the data to at least one of the powered devices via a second cable comprised in the LAN cabling, so that the module acts as a mid-span device.

Preferably, the communication devices communicate over the LAN according to an IEEE standard 802.3af.

There is further provided, according to a preferred embodiment of the present invention, a method for supplying power to communication devices operating within a Local Area Network (LAN) over LAN cabling, the communication devices including one or more powered devices adapted to receive power over the LAN cabling, the method including:

providing circuitry as a first application specific integrated circuit (ASIC), and which is adapted to identify the powered devices on the LAN;

generating in the circuitry respective output voltages for supplying power to the powered devices over the LAN cabling; and providing a controller as a second ASIC, and which monitors and controls the circuitry; and operating the controller and the circuitry so as to monitor and control the output voltages and the power supplied to the powered devices.

The method preferably includes mounting the first ASIC on a first single in-line package (SIP) and mounting the second ASIC on a second SIP.

Further preferably, the method includes:

mounting the first SIP and the second SIP on a board so as to form a single module; and providing a switching hub which is adapted to receive the single module.

Preferably, the board functions as a daughter board which is adapted to be mounted on a mother board comprised in the switching hub.

Further preferably, the switching hub includes dimensions enabling the switching hub to be disposed within an industry-standard rack, and the dimensions consist of a height no greater than 45 mm and a width no greater than 430 mm.

Preferably, the switching hub includes a chassis having a back plane with connectors which are adapted to receive respective individual cards, and the board is adapted to mount on at least one of the individual cards.

The present invention will be more fully understood from the following detailed description of the preferred embodiments thereof, taken together with the drawings in which:

DETAILED DESCRIPTION OF PREFERRED EMBODIMENTS

Figure 1:
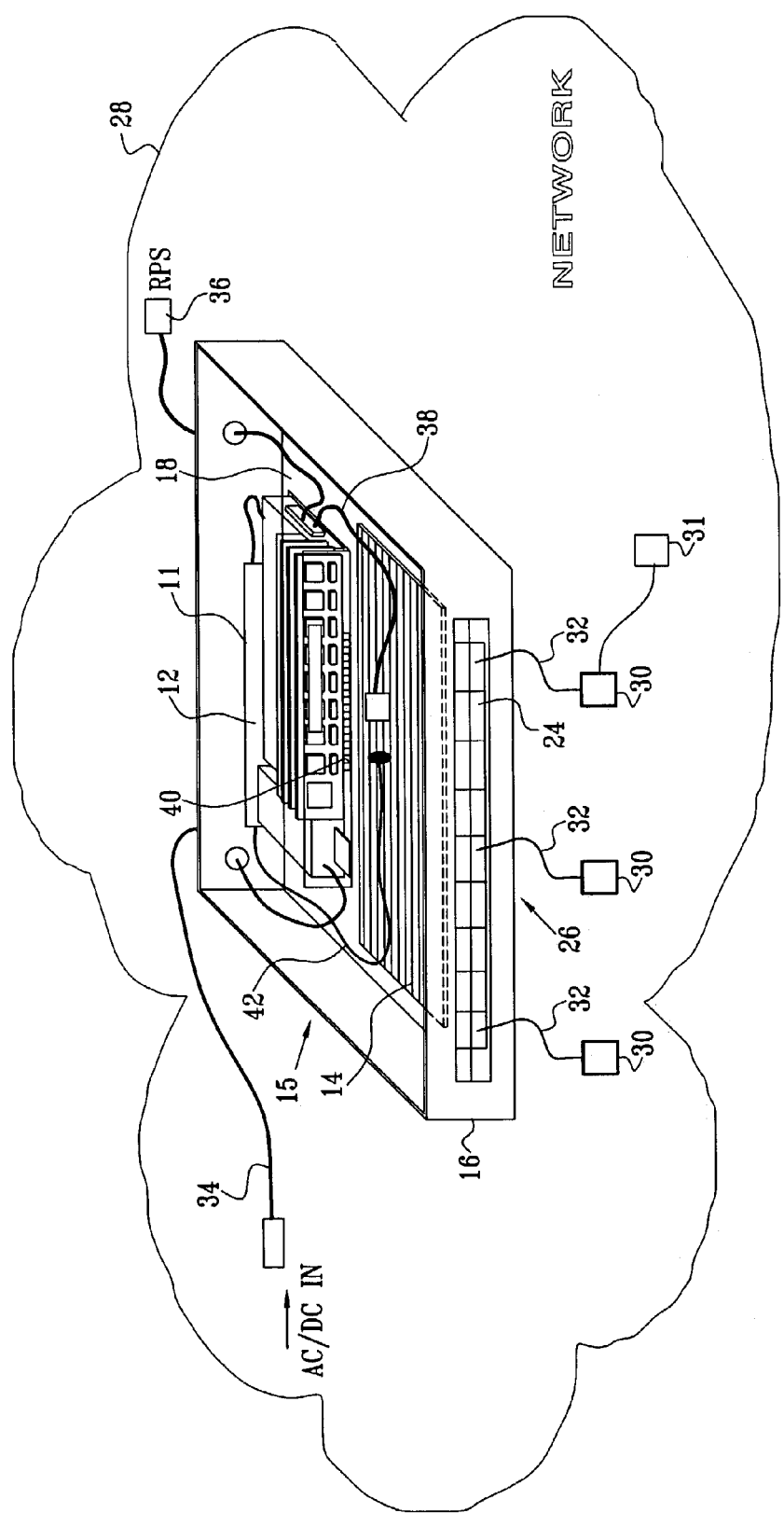
FIG. 1 is a schematic perspective diagram of an Ethernet switch, according to a preferred embodiment of the present invention.

FIG. 1 is a schematic perspective diagram of an Ethernet switch 26, according to a preferred embodiment of the present invention. Switch 26 comprises a Power over LAN module 12 and an Ethernet switch board 14 acting as a switching hub 15 and mounted in an Ethernet switch chassis 16. Switch 26 operates within a local area network (LAN) 28 and communicates with other switches, terminals, and/or network devices of the LAN, herein termed remote network devices 30, via respective dedicated communication cables 32 comprising twisted-wire-pairs. Cables 32 may comprise any communication cables known in the art which are able to convey both data and power, such as category 3–7 cables. By way of example, cables 32 are hereinbelow assumed to comprise category 5 cables having twisted pairs of wires. In addition to other switches and terminals, remote network devices 30 may comprise, but are not limited to, communication devices 31 such as an Internet Protocol (IP) telephone, an IP camera, and a wireless LAN access point. The communications between switch 26 and other network elements are via connectors 24 coupled to the Category 5 cables at the front of chassis 16. Chassis 16 may include one or more expansion slots, at least one of which may act as an uplink path for signals from devices 30 or 31. At least some of the remote network devices 30 comprise powered devices which are powered via the Category 5 cables, as described hereinbelow.

Switch chassis 16 most preferably has industry-standard dimensions of height approximately equal to 45 mm and width approximately equal to 430 mm so that the switch chassis conforms with "1U" standard specifications for 19" rack-mounted devices, and so that switch 26 may be installed as a "stackable" switch within a cabinet designed for multiple chassis, each chassis being similar to chassis 16. Module 12 most preferably has a height no larger than 40 mm and a width no larger than 105 mm, so that when installed in chassis 16, the complete switch conforms with its industry-standard 1U dimensions.

Module 12 is most preferably implemented to provide regulated DC power for switch board 14, and also to generate regulated DC power for remote devices 30. The DC power for remote devices 30 is conveyed to the remote elements via switch board 14, connectors 24, and cables 32. The DC power is conveyed over cables 32, preferably according to a standard IEEE 802.3af referred to in the Background of the Invention. Components of module 12, described in more detail hereinbelow, are attached to a module chassis 11, and module 12 is installed in a space 18 in chassis 16. In prior art switches, space 18 is provided in chassis 16 to accommodate a power supply for driving board 14. However, unlike the prior art power supply, module 12 is able to power both switch board 14 and remote devices 30. Module 12 may be a PD-IM-7024 module, produced by PowerDsine Ltd., of Hod Hasharon, Israel.

Module 12 receives its power from an AC line connection 34, or alternatively from a DC supply. Most preferably, module 12 is also coupled to a redundant power supply (RPS) 36, which operates as a backup power supply if there is a malfunction in module 12. If RPS 36 is present, one or more parameters of the RPS are most preferably programmed into module 12 to ensure operation of the RPS in the event of module malfunction, as described below. Module 12 preferably provides regulated DC power, comprising standard DC voltages such as 5V, 9V, or 12V, via a cable 38, to switch board 14, and provides approximately 48V DC regulated power for connections 24 via connectors 40 coupling the module to the switch board. By way of example, the standard voltage supplied by module 12 is assumed hereinbelow to be 12V. Module 12 communicates with board 14, preferably using serial communication, via a cable 42.

Figure 2:
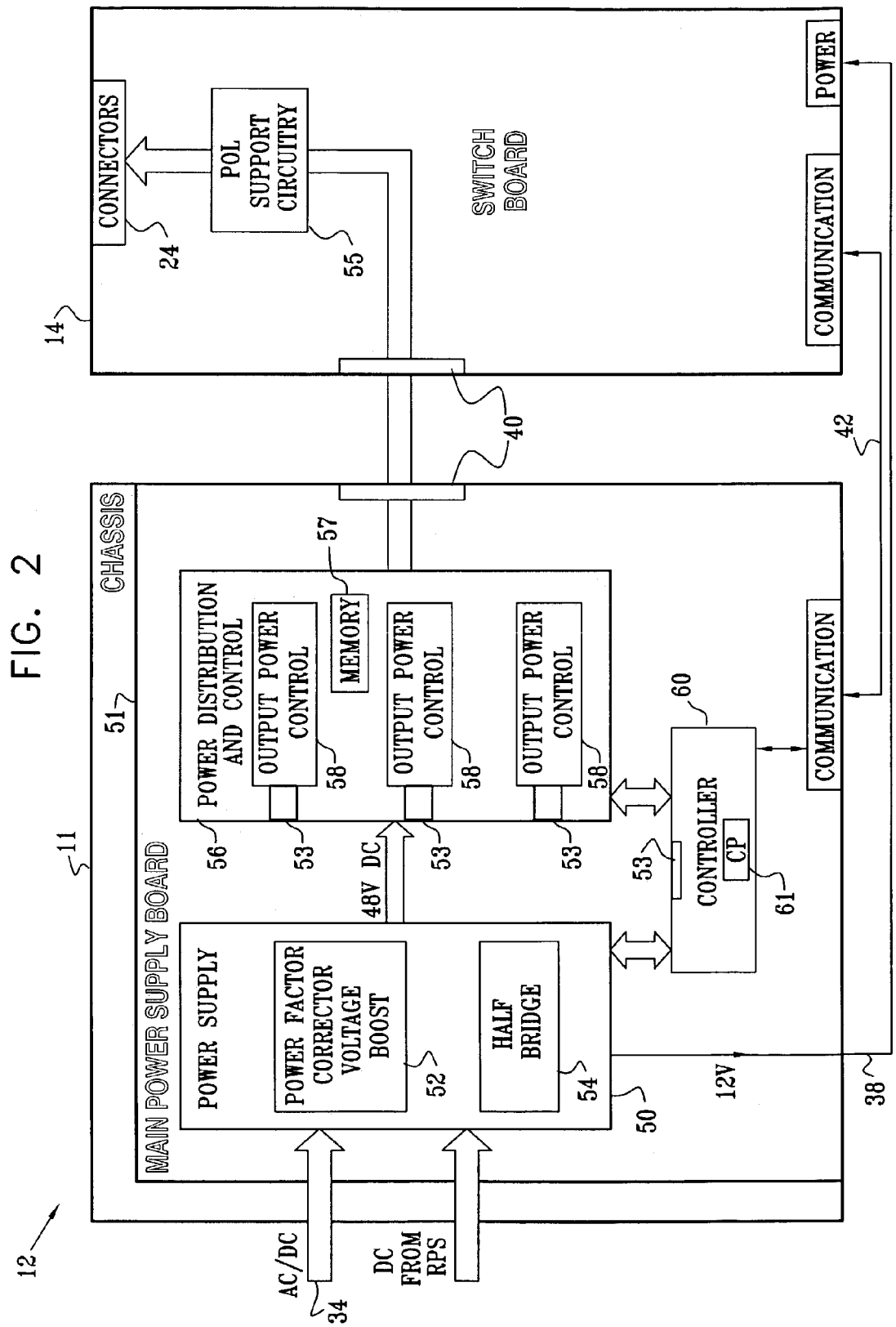
FIG. 2 is a block diagram of a module and a switch board located in the switch of FIG. 1, according to a preferred embodiment of the present invention.

FIG. 2 is a block diagram of module 12 and switch board 14, according to a preferred embodiment of the present invention. A power supply 50, mounted on a main power supply board 51 in module chassis 11, preferably receives AC power from line connection 34, and/or DC power from a DC input, and generates regulated DC levels which, inter alia, include the 12 V DC and 48 V DC levels described above with reference to FIG. 1, as well as a regulated voltage used to power elements comprised within module 12. Alternatively, power supply 50 receives DC power from RPS 36. Power supply 50 is implemented to switch between line connection 34 and RPS 36, depending on voltage levels supplied by the line connection and the RPS.

Most preferably, power supply 50 includes a power factor corrector (PFC) circuit 52 which also generates a boosted voltage value of approximately 400 V DC. The 400V DC level is preferably used by a half-bridge circuit 54 to generate the DC levels provided by supply 50. Both PFC and half-bridge circuits are known in the electronic art as circuits which improve an overall efficiency of generation of the DC levels provided by power supply 50. PFC circuit 52 most preferably comprises a circuit similar to that described in U.S. patent application Ser. No. 10/151,406, filed May 17, 2002, which is assigned to the assignee of the present invention, and which is incorporated herein by reference.

Power distribution and control circuitry 56 receives the 48V DC level from connector 40 and delivers it via the connector to board 14. Board 14 most preferably comprises power over LAN support circuitry 55, which receives the 48V DC level and which couples it, typically via components such as fuses and the center-taps of data transformers, to each connector within connector 24 so that each cable 32 (FIG. 1) is able to convey both communication data and power to a respective device 32. Most preferably, the 48 V DC level is coupled to each connector within connector 24 according to a method described in standard 802.3af, so that power may be fed from connector 24 either via a twisted-data-pair of conductors, or via a twisted-spare-pair of conductors.

Circuitry 56 comprises one or more sub-circuits 58, preferably three sub-circuits, which utilize the 48V level in order to generate output power and levels for connectors 24 that are compliant with standard 802.3af. Each sub-circuit 58 is most preferably in the form of a single in-line package (SIP) which mounts, preferably by soldering, into a respective receptacle 53 on board 51. Alternatively, the sub-circuits are mounted onto a board, which may act as a daughter board and which in turn mounts, in switching hub 15, onto board 51 or switch board 14, the latter acting as a mother board. Further alternatively, switching hub 15 may comprise a back plane with connectors for receiving individual cards, as is known in the art. In this case the board upon which the sub-circuits are mounted in turn mounts on one of the individual cards. A suitable circuit for each of sub-circuits 58 comprises a PD-IM-7124 and/or a PD-IM-7148 SIP, produced by PowerDsine Ltd. Each sub-circuit 58 supplies and monitors channels coupled to connectors 24. Each channel is monitored to check that its respective remote element 30 provides a powered device (PD) "signature," so identifying the remote element. (The concept of PD signature is described in the Background of the Invention, and also in more detail in the Application Notes referred to therein.) Provided that a valid PD signature is received, the respective sub-circuit 58 supplies current to element 30 within an operating range, and for operating parameters, defined by standard 802.3af.

A dedicated controller 60, powered by the regulated voltage level generated by supply 50 and comprising a central processor (CP) 61, preferably an MC68HC912B22 produced by Motorola, Inc. of Schaumburg, Ill., monitors and provides general control to the supply, and to power distribution circuitry 56. Controller 60 is most preferably implemented as a SIP mounting on one of receptacles 53 on board 51. Alternatively, controller 60 mounts onto the daughter board described above. Controller 60 also communicates with switch board 14, transferring data/instructions between the board and module 12 via line 42. SIPs comprising sub-circuits 58 and controller 60 are preferably mounted on a daughter board connected to main board 51. Alternatively, the SIPs are mounted to main board 51 without using a daughter board.

Controller 60 also comprises a memory 57 wherein are stored parameters of RPS 36 such as a voltage generated by the RPS and an available operation time of the RPS. Controller 60 is preferably adapted to measure one or more parameters of power output from power supply 50, such as a voltage level or a current drawn, so as to detect when module 12 is in an RPS mode, wherein RPS 36 is utilized. In the event that the RPS mode is operative, most preferably the parameters stored in memory 57 are updated during the course of operation of the RPS. Where possible, in the RPS mode controller 60 most preferably modifies outputs supplied by circuitry 56, using output voltage measurements, so as to conserve the RPS.

Figure 3:
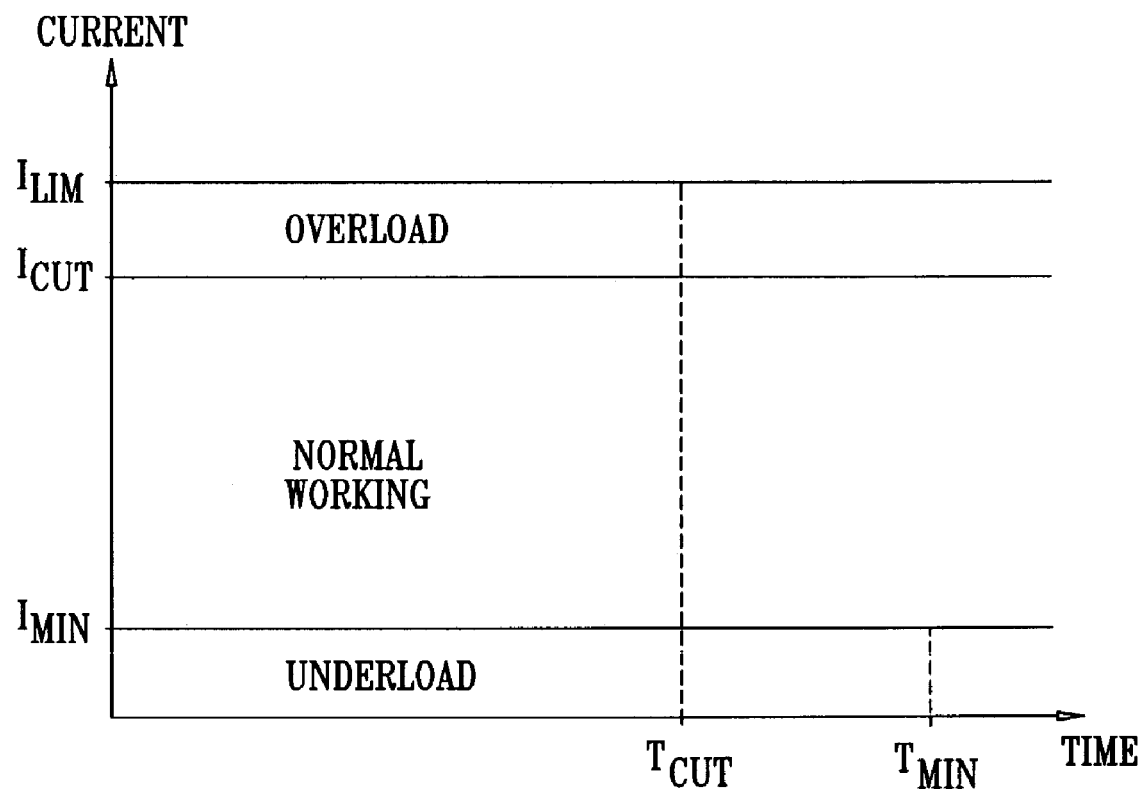
FIG. 3 is a graph illustrating parameters checked and set by a sub-circuit comprised in the module of FIG. 2, according a preferred embodiment of the present invention.

FIG. 3 is a graph illustrating parameters checked and set by each sub-circuit 58, according a preferred embodiment of the present invention. The parameters illustrated in FIG. 3 are checked and set for each channel powering a PD. Table I below describes the parameters.

TABLE I

| Parameter | Description |
| --- | --- |
| $I_{lim}$ | A maximum current that may be delivered to the PD by sub-circuit 58. |
| $I_{cut}$ | A highest current that may be drawn by the PD in normal working. |

TABLE I-continued

| Parameter | Description |
| --- | --- |
| $I_{min}$ | A lowest current that may be drawn by the PD in normal working. |
| $T_{cut}$ | A time period during which current delivered to the PD may be greater than $I_{cut}$ and less than $I_{lim}$. |
| $T_{min}$ | A time period during which current delivered to the PD may be lower than $I_{min}$. |

Figure 4:
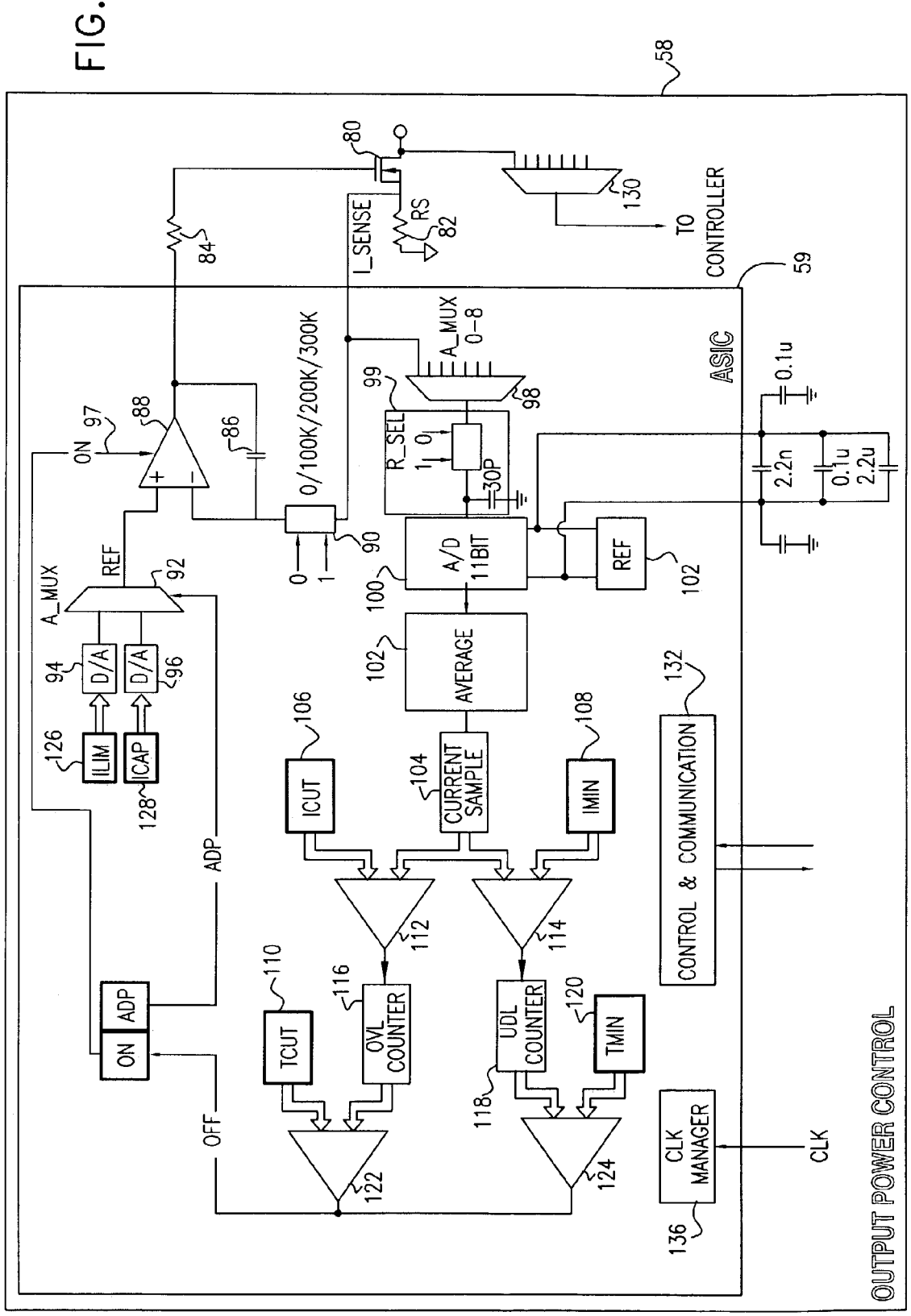
FIG. 4 is a block diagram of the sub-circuit, according to a preferred embodiment of the present invention.

FIG. 4 is a block diagram of sub-circuit 58, according to a preferred embodiment of the present invention. Sub-circuit 58 supplies power for a plurality of channels, assumed herein by way of example to be eight. Sub-circuit 58 comprises a transistor 80, preferably a field effect transistor (FET) 80, such as an IRLR130 transistor produced by Fairchild Semiconductor International, Inc., of South Portland Me., or alternatively a bipolar transistor. Hereinbelow transistor 80 is assumed to be an FET. A current sensing resistor 82 having a value of approximately 2Ω is coupled to the drain of FET 80, and an FET gate resistor 84 having a value of approximately 100Ω is coupled to the gate of FET 80. Components 80, 82 and 84 are shown in the figure for one channel; these components are duplicated for each respective channel, but for clarity only components for one channel are shown in FIG. 4.

FET 80 acts as a current switch and current limiter for its respective channel. Apart from FET 80, resistor 82, resistor 84 and a multiplexer 130 (described in more detail below), components comprised in sub-circuit 58 are most preferably implemented as an application specific integrated circuit (ASIC) 59. Alternatively, components comprised in sub-circuit 58 are implemented as discrete devices, or as a combination of discrete and custom devices.

The output from an operational amplifier (OA) 88 is conveyed via resistor 84 to the gate of FET 80. As described in more detail below, OA 88 functions in three modes: as a comparator, as a current limiter, and as a current source for charging capacitors of the PD being powered by FET 80. The current drawn by the channel is measured by current sensing resistor 82, and the level sensed by the resistor is used as a first input to OA 88. The first input is integrated in a variable integrator formed from a resistor 90 and a capacitor 86 having an approximate capacitance of 30 pf. Most preferably, resistor 90 comprises a resistor having a resistance which may be selected, by controller 60 (FIG. 2), as a value chosen from 0 kΩ, 100 kΩ, 200 kΩ, and 300 kΩ.

The level sensed by resistor 82 is also input, via a multiplexer 98 which sequentially samples all other current sensing resistors, to an analog-to-digital converter (ADC) 100. The input to ADC 100 is smoothed in an RC filter 99, formed from a selectable resistor chosen by controller 60 from values of 0 kΩ, 6 kΩ, 40 kΩ, and 80 kΩ, and a capacitor having a value of 30 pF. ADC 100 receives a reference level (REF 102), most preferably set at 3.3 VDC, and a clock from controller 60, and uses these inputs to perform its digitization. Most preferably, four samples from ADC 100 are averaged in an averager 102, and the averaged value is stored in a current sample buffer 104.

The value in buffer 104 is used to ensure that operation of the respective PD (the PD generating the averaged sample stored in the buffer) is within the bounds described above with respect to FIG. 3. In a comparator 114, the stored value of the current sample is checked to see if it is greater than $I_{min}$, by comparing it with a value of $I_{min}$ stored in a buffer 108. In a comparator 112, the stored value of the current sample is checked to see if it is less than $I_{cut}$, by comparing it with a value of $I_{cut}$ stored in a buffer 106. If limit $I_{cut}$ is exceeded, an overload-time counter (OVL) 116 is initiated. If the stored value is less than $I_{min}$, an underload-time counter (UDL) 118 is initiated. For subsequent samples provided by buffer 104, each counter is incremented or is reset to zero, depending on the value in the buffer, so that a continuing time for overload is measured by OVL 116 and a continuing time for underload is measured by UDL 118.

A comparator 122 checks if the continuing time for overload is greater than $T_{cut}$, stored in a buffer 110. Similarly, a comparator 124 checks if the continuing time for underload is greater than $T_{min}$, stored in a buffer 120. If either $T_{cut}$ or $T_{min}$ is exceeded, a control signal level OFF replaces an ON level input 97 to OA 88, so that the amplifier forces FET 80 to switch current to its respective PD off.

While in an on state, i.e., while the ON level is input to OA 88, the amplifier compares the current measured by resistor 82 with a reference level derived from a multiplexer 92. Multiplexer 92 generates its levels from an $T_{lim}$ level stored in an $I_{lim}$ buffer 126 and converted to an analog value by a digital to analog converter (DAC) 94, or from an $I_{cap}$ level stored in an $I_{cap}$ buffer 128 and converted in a DAC 96. The $I_{lim}$ value is most preferably derived from standard 802.3af. $I_{cap}$ corresponds to a current which is used for investigating a PD having an identifying capacitor, as described in Application Note 115 referred to in the Background of the Invention. Multiplexer 92 cycles through values of $I_{lim}$ and/or $I_{cap}$, corresponding to channels supplied by sub-circuit 58, and applies each value in turn to a second input of OA 88. Multiplexer 92 switches between providing values of $I_{lim}$ and $I_{cap}$ according to an adaptation (ADP) control line derived from controller 60. OA 88 uses the value of $I_{lim}$ to limit the current supplied to the PD when FET 80 is in a conducting state.

Providing that the sensed current input to OA 88 is less than $I_{lim}$, the output from the amplifier maintains FET 80 in its conducting state, so that power is provided to the respective PD. If the sensed current input is greater than $I_{cut}$ for longer than period $T_{cut}$, OA 88 forces FET 80 into a non-conducting state.

A voltage at the respective PD is measured via multiplexer 130, which samples each PD in turn, and conveys the sampled level to an ADC in controller 60. Controller 60 uses this voltage during a line interrogation phase, for PD investigation according to standard 802.3af. Controller 60 uses the current determined by current-sensing resistor 82 to evaluate a total power dissipated by the PD. If the power is found to exceed a pre-defined limit, controller 60 cuts power to the respective PD by switching the output of OA 88 to "off." Communication signals between sub-circuit 58 and controller 60 are transferred via a control and communication interface 132, and a clock signal is also received from the controller in a clock manager 136, the manager providing clock signals for other elements of circuit 58.

It will be appreciated that module 12 provides power both to switch board 14 and to other elements of network 28, remote from the switch board. Furthermore, because of the small dimensions of the module, described above with reference to FIG. 1, the module and the board are able to be mounted in a single standard chassis having standard dimensions, thus saving space compared to other systems known in the art.

It will also be appreciated that module 12 and/or switch board 14 may be arranged in configurations other than that specifically described hereinabove. Such configurations include, but are not limited to, using module 12 in a mid-span configuration to provide power over LAN to elements in network 28, or using more than one module, each substantially similar to module 12, within switching hub 15 (FIG. 1). It will be understood that in a mid-span configuration, module 12 is coupled by LAN cables in an intermediate position between a switch board such as board 14 and powered devices to which the module is supplying power.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for supplying power to communication devices operating within a Local Area Network (LAN) over LAN cabling, the communication devices including one or more powered devices adapted to receive power over the LAN cabling, the apparatus comprising:

a power supply which is adapted to receive power from an unregulated source and to provide therefrom regulated power;

power distribution and control circuitry, which is adapted to identify the powered devices on the LAN, to receive the regulated power and to generate therefrom respective current limited output voltages for supply to the powered devices, and to monitor the current drawn by each of the powered devices, said current limited output voltages exhibiting a maximum current and a highest current which may drawn in normal working, said maximum current being greater than said highest normal current, said power distribution and control circuitry being adapted to allow the current drawn by each of the powered devices to exceed said highest normal current only for a predetermined time period so long as said current being drawn does not exceed said maximum current; and a chassis which retains the power supply and the power distribution and control circuitry as a single module.

2. Apparatus according to claim 1, and comprising a switching hub within which the single module is disposed, and wherein the power supply provides further regulated power to power the switching hub.

3. Apparatus according to claim 2, and comprising one or more further single modules each of which is disposed within the switching hub and is substantially similar to the single module.

4. Apparatus according to claim 2, wherein the switching hub comprises dimensions enabling the switching hub to be disposed within an industry-standard rack.

5. Apparatus according to claim 1, wherein the LAN cabling comprises at least one cable which is coupled to a respective powered device comprised in the powered devices, and wherein the at least one cable comprises a twisted-data-pair of conductors which provide data communication to the respective powered device, and wherein the power distribution and control circuitry is adapted to provide powered-device regulated power over the twisted-data-pair to the respective powered device.

6. Apparatus according to claim 1, wherein the LAN cabling comprises at least one cable which is coupled to a respective powered device comprised in the powered devices, and wherein the at least one cable comprises a twisted-spare-pair of conductors which are adapted to provide data communication to the respective powered device, and wherein the power distribution and control circuitry is adapted to provide powered-device regulated power over the twisted-spare-pair to the respective powered device.

7. Apparatus according to claim 1, wherein the power distribution and control circuitry is adapted to provide powered-device regulated power, derived from the respective output voltages, to at least one powered device comprised in the powered devices, and to adjust a level of the powered-device regulated power allocated to the at least one powered device responsive to an overall level of total powered-device regulated power provided by the power distribution and control circuitry to the powered devices.

8. Apparatus according to claim 1, wherein the power supply is adapted to receive the power as alternating current (AC) power or as direct current (DC) power.

9. Apparatus according to claim 1, and comprising a redundant power supply (RPS) which is adapted to supply redundant regulated power, and wherein the power distribution and control circuitry is adapted to receive at least one of the regulated power and the redundant regulated power.

10. Apparatus according to claim 9, and comprising a controller having a memory wherein is stored at least one parameter of the RPS, and wherein the controller is adapted to measure a parameter of the regulated power and to operate the apparatus in an RPS mode, wherein at least one of the power supply and the power distribution and control circuitry receive power from the RPS, and to control at least one of the respective output voltages responsive to the at least one RPS parameter and the measured parameter.

11. Apparatus according to claim 1, wherein the communication devices communicate over the LAN according to an IEEE standard 802.3af.

12. Apparatus fore supplying power to communication devices operating within a Local Area Network (LAN) over LAN cabling, the communication devices including one or more powered devices adapted to receive power over the LAN cabling, the apparatus comprising: circuitry, which is adapted to identify the powered devices on the LAN and to generate respective output voltages for supplying power to the powered devices over the LAN cabling, wherein the circuitry comprises a first application specific integrated circuit (ASIC); and a controller which monitors and controls the circuitry and which together with the circuitry monitors and controls the output voltages and the power supplied to the powered devices, and which is implemented as a second ASIC.

13. Apparatus according to claim 12, wherein the first ASIC is mounted on a first single in-line package (SIP) and wherein the second ASIC is mounted on a second SIP.

14. Apparatus according to claim 13, and comprising: a board to which the first SIP and the second SIP are mounted so as to form a single module; and a switching hub which is adapted to receive the single module.

15. Apparatus according to claim 14, wherein the board functions as a daughter board which is adapted to be mounted on a mother board comprised in the switching hub.

16. Apparatus according to claim 14, wherein the switching hub comprises dimensions enabling the switching hub to be disposed within an industry-standard rack, and wherein the dimensions comprise a height no greater than 45 mm and a width no greater than 430 mm.

17. Apparatus according to claim 14, wherein the switching hub comprises a chassis having a back plane with connectors which are adapted to receive respective individual cards, and wherein the board is adapted to mount on at least one of the individual cards.

18. A method for supplying power to communication devices operating within a Local Area Network (LAN) over LAN cabling, the communication devices including one or more powered devices adapted to receive power over the LAN cabling, the method comprising:
   receiving power from an unregulated source in a power supply;
   generating in the power supply regulated power from the unregulated source;
   identifying the powered devices on the LAN in power distribution and control circuitry;
   receiving the regulated power in the power distribution and control circuitry;
   generating in the power distribution and control circuitry, responsive to the regulated power, respective current limited output voltages for supply to the powered devices;
   monitoring said current limited output voltages to maintain a maximum current and a highest current which may be drawn in normal working, said maximum current being greater than said highest normal current;
   in the event that said current limited output exceeds said highest normal current but is less than said maximum current, allowing said excess current for only a predetermined time; and
   housing the power supply and the power distribution and control circuitry as a single module.

19. A method according to claim 18, and comprising providing a switching hub within which the single module is disposed, and wherein the power supply provides a further regulated power level to power the switching hub.

20. A method according to claim 19, and comprising providing one or more further single modules each of which is substantially similar to the single module, and disposing each further single module within the switching hub.

21. A method according to claim 19, wherein the switching hub comprises dimensions enabling the switching hub to be disposed within an industry-standard rack.

22. A method according to claim 18, wherein the LAN cabling comprises at least one cable which is coupled to a respective powered device comprised in the powered devices, and wherein the at least one cable comprises a twisted-data-pair of conductors which provide data communication to the respective powered device, and wherein the power distribution and control circuitry is adapted to provide powered-device regulated power over the twisted-data-pair to the respective powered device.

23. A method according to claim 18, wherein the LAN cabling comprises at least one cable which is coupled to a respective powered device comprised in the powered devices, and wherein the at least one cable comprises a twisted-spare-pair of conductors which are adapted to provide data communication to the respective powered device, and wherein the power distribution and control circuitry is adapted to provide powered-device regulated power over the twisted-spare-pair to the respective powered device.

24. A method according to claim 18, wherein the power distribution and control circuitry is adapted to provide powered-device regulated power, derived from the respective output voltages, to at least one powered device comprised in the powered devices, and to adjust a level of the powered-device regulated power allocated to the at least one powered device responsive to an overall level of total powered-device regulated power provided by the power distribution and control circuitry to the powered devices.

25. A method according to claim 18, wherein receiving the power in the power supply comprises receiving alternating current (AC) power or direct current (DC) power.

26. A method according to claim 18, and comprising providing a redundant power supply (RPS) which is adapted to supply redundant regulated power, and wherein the power distribution and control circuitry is adapted to receive at least one of the regulated power and the redundant regulated power.

27. A method according to claim 26, and comprising providing a controller having a memory wherein is stored at least one parameter of the RPS, and wherein the controller is adapted to measure a parameter of the regulated power and to operate the apparatus in an RPS mode wherein at least one of the power supply and the power distribution and control circuitry receive power from the RPS, and to control at least one of the respective output voltages responsive to the at least one RPS parameter and the measured parameter.

28. A method according to claim 18, wherein the communication devices communicate over the LAN according to an IEEE standard 802.3af.

29. A method for supplying power to communication devices operating within a Local Area Network (LAN) over LAN cabling, the communication devices including one or more powered devices adapted to receive power over the LAN cabling, the method comprising: providing circuitry as a first application specific integrated circuit (ASIC), and which is adapted to identify the powered devices on the LAN; generating in the circuitry respective output voltages for supplying power to the powered devices over the LAN cabling; providing a controller as a second ASIC, and which monitors and controls the circuitry; and operating the controller and the circuitry so as to monitor and control the output voltages and the power supplied to the powered devices.

30. A method according to claim 29, and comprising mounting the first ASIC on a first single in-line package (SIP) and mounting the second ASIC on a second SIP.

31. A method according to claim 30, and comprising: mounting the first SIP and the second SIP on a board so as to form a single module: and providing a switching hub which is adapted to receive the single module.

32. A method according to claim 31, wherein the board functions as a daughter board which is adapted to be mounted on a mother board comprised in the switching hub.

33. A method according to claim 31, wherein the switching hub comprises dimensions enabling the switching hub to be disposed within an industry-standard rack, and wherein the dimensions comprise a height no greater than 45 mm and a width no greater than 430 mm.

34. A method according to claim 31, wherein the switching hub comprises a chassis having a back plane with connectors which are adapted to receive respective individual cards, and wherein the board is adapted to mount on at least one of the individual cards.

35. Apparatus for supplying power to communication devices operating within a Local Area Network (LAN) over LAN cabling, the communication devices including one or more powered devices adapted to receive power over the LAN cabling, the apparatus comprising:
   a power supply which is adapted to receive power from an unregulated source and to provide therefrom regulated power;
   power distribution and control circuitry, which is adapted to identify the powered devices on the LAN, to receive the regulated power and to generate therefrom respective output voltages for supply to the powered devices;

a chassis which retains the power supply and the power distribution and control circuitry as a single module; and a switching hub within which the single module is disposed, and wherein the power supply provides further regulated power to power the switching hub, said switching hub comprising dimensions enabling the switching hub to be disposed within an industry-standard rack, said dimensions comprising a height no greater than 45 mm and a width no greater than 430 mm.

36. Apparatus for supplying power to communication devices operating within a Local Area Network (LAN) over LAN cabling, the communication devices including one or more powered devices adapted to receive power over the LAN cabling, the apparatus comprising:

a power supply which is adapted to receive power from an unregulated source and to provide therefrom regulated power;

power distribution and control circuitry, which is adapted to identify the powered devices on the LAN, to receive the regulated power and to generate therefrom respective output voltages for supply to the powered devices;

a chassis which retains the power supply and the power distribution and control circuitry as a single module; and a switching hub within which the single module is disposed, and wherein the power supply provides further regulated power to power the switching hub, the single module comprising dimensions enabling the single module to replace a switching hub power supply disposed in the switching hub and adapted to only power the switching hub.

37. Apparatus for supplying power to communication devices operating within a Local Area Network (LAN) over LAN cabling, the communication devices including one or more powered devices adapted to receive power over the LAN cabling, the apparatus comprising:

a power supply which is adapted to receive power from an unregulated source and to provide therefrom regulated power;

power distribution and control circuitry, which is adapted to identify the powered devices on the LAN, to receive the regulated power and to generate therefrom respective output voltages for supply to the powered devices;

a chassis which retains the power supply and the power distribution and control circuitry as a single module;

a switching hub external to the single module; and a first cable comprised in the LAN cabling, the first cable being adapted to convey data between the switching hub and the single module, and wherein the power and control circuitry is adapted to convey the respective output voltages and the data to at least one of the powered devices via a second cable comprised in the LAN cabling, so that the single module acts as a mid-span device.

38. A method for supplying power to communication devices operating within a Local Area Network (LAN) over LAN cabling, the communication devices including one or more powered devices adapted to receive power over the LAN cabling, the method comprising:

receiving power from an unregulated source in a power supply;

generating in the power supply regulated power from the unregulated source;

identifying the powered devices on the LAN in power distribution and control circuitry;

receiving the regulated power in the power distribution and control circuitry;

generating in the power distribution and control circuitry, responsive to the regulated power, respective output voltages for supply to the powered devices; and housing the power supply and the power distribution and control circuitry as a single module; and providing a switching hub within which the single module is disposed, and wherein the power supply provides a further regulated power level to power the switching hub, wherein the switching hub comprises dimensions enabling the switching hub to be disposed within an industry-standard rack, said dimensions comprising a height no greater than 45 mm and a width no greater than 430 mm.

39. A method for supplying power to communication devices operating within a Local Area Network (LAN) over LAN cabling, the communication devices including one or more powered devices adapted to receive power over the LAN cabling, the method comprising:

receiving power from an unregulated source in a power supply;

generating in the power supply regulated power from the unregulated source;

identifying the powered devices on the LAN in power distribution and control circuitry;

receiving the regulated power in the power distribution and control circuitry;

generating in the power distribution and control circuitry, responsive to the regulated power, respective output voltages for supply to the powered devices; and housing the power supply and the power distribution and control circuitry as a single module; and providing a switching hub within which the single module is disposed, wherein the power supply provides a further regulated power level to power the switching hub and wherein the module comprises dimensions enabling the module to replace a switching hub power supply disposed in the switching hub and adapted to only power the switching hub.

40. A method for supplying power to communication devices operating within a Local Area Network (LAN) over LAN cabling, the communication devices including one or more powered devices adapted to receive power over the LAN cabling, the method comprising:

receiving power from an unregulated source in a power supply;

generating in the power supply regulated power from the unregulated source;

identifying the powered devices on the LAN in power distribution and control circuitry;

receiving the regulated power in the power distribution and control circuitry;

generating in the power distribution and control circuitry, responsive to the regulated power, respective output voltages for supply to the powered devices; and housing the power supply and the power distribution and control circuitry as a single module; and providing a switching hub external to the module, and a first cable comprised in the LAN cabling, the first cable being adapted to convey data between the switching hub and the module, and wherein the power and control circuitry is adapted to convey the respective output voltages and the data to at least one of the powered devices via a second cable comprised in the LAN cabling, so that the module acts as a mid-span device.

* * * * *